United States Patent Office 3,639,521

Patented Feb. 1, 1972

3,639,521

POLAR COMPOUND ADJUVANTS FOR IMPROVED BLOCK POLYMERS PREPARED WITH PRIMARY HYDROCARBYLLITHIUM INITIATORS

Henry L. Hsieh, Bartlesville, Okla., assignor to Phillips Petroleum Company

No Drawing. Filed Apr. 23, 1969, Ser. No. 818,804
Int. Cl. C08f 15/04
U.S. Cl. 260—880 4 Claims

ABSTRACT OF THE DISCLOSURE

High raw tensile strength radial and linear block polymers are prepared by the incremental addition of monomers employing a particular sequence of addition using primary hydrocarbyllithium initiators with small amounts of polar compound adjuvants.

This invention relates to a process for preparing high raw tensile strength radial and linear block polymers.

This invention further relates to a polymerization process employing polar compound adjuvants for improved block polymers prepared with hydrocarbyllithium initiators.

This invention further relates to a process for preparing block polymers processing relatively uniform lengths and containing minimum amounts of macromolecules having varying block lengths.

Secondary and tertiary alkyllithium catalysts have in the past been employed for the preparation of block polymers such as those containing three component polymer blocks or segments. The primary hydrocarbyllithium initiators are generally known to be less satisfactory in the formation of similar block polymers. This apparent nature of the primary hydrocarbyllithium initiators is particularly disappointing for there are many practical reasons for employing a primary hydrocarbyllithium initiator such as n-butyllithium in place of a secondary or tertiary butyllithium catalyst.

These branched alkyllithium catalysts are quite unstable at room temperatures thus often necessitating special storage conditions therefor. Secondary butyllihium is generally more expensive commercially than is n-butyllithium and much less available. There are few if any commercial sources available outside of the United States for purchase of these branched alkyllithium catalysts.

Multiple advantages would therefore be availed if primary hydrocarbyllithium initiators such as n-butyllithium could be satisfactorily employed in such a polymerization process for preparing block polymers.

Surprisingly, a process has now been discovered that resolves the problem of employing the incenvinient and the impractical secondary and tertiary butyllithium initiators in the preparation of block polymers. According to my invention the more practical and convenient primary hydrocarbyllithium initiators can be employed to produce a superior ploymeric product with high raw tensile strength equal or greater than that obtained by known processes employing branched alkyllithium initiators.

It has now been discovered that high raw tensile strength radial anl linear block polymers can be prepared by employing a primary hydrocarbyllithium initiator and a small amount of polar compound adjuvant in a polymerization process if the radial or linear block polymer is prepared by using a polymerization method known as the incremental addition of monomers and if a non-elastomeric block or segment for said radial or linear block polymer is formed first.

It is an object of this invention to provide a process for preparing high raw tensile strength radial and linear block polymers.

It is another object of this invention to provide a process for preparing batches of block polymers which possess relatively uniform lengths and contain minimum amounts of macromolecules having varying block lengths.

It is another object of this invention to provide a process for producing high raw tensile strength linear block polymers containing terminal non-elastomeric polymer blocks and an elastomeric polymer block as a middle segment.

It is another object of this invention to provide raw tensile strength radial polymers containing terminal non-elastomeric polymer blocks, i.e., on the ends of the branches of said radial polymer.

It is a further object of this invention to provide an improved polymerization process for producing superior high raw tensile strength polymers by employing primary hydrocarbyllithium initiators and polar compound adjuvants.

Other objects, features, and advantages of my invention will be apparent to those skilled in the art from the following disclosure and discussion herein set forth.

According to this invention high raw tensile strength radial and linear block polymers can be prepared by (a) employing a primary hydrocarbyllithium initiator, (b) using a polar compound adjuvant in the polymerization process in an amount sufficient to provide from about 0.01 to 100 gram millimoles of adjuvant per 100 grams of monomer employed, preferably 0.2 to 10, (c) using the polymerization process known as the incremental addition of monomer method and by (d) first forming a non-elastomeric block or segment when making said block polymer.

The incremental addition of monomer method herein employed is characterized by first forming a non-elastomeric block or segment of polymer by polymerizing a monomer or mixtures of monomers until substantially no initial monomer or monomers remain in the reaction mixture, adding a dissimilar monomer or mixtures of dissimilar monomers to the reaction medium in order to add to said non-elastomeric polymer block or segment of elastomeric polymer by continuing the polymerization according to said inmremental addition process.

Following the formation of this second elastomeric section, i.e., after substantially all of the monomer or mixtures of monomers have been polymerized, a terminal non-elastomeric polymer block can be formed by continuing the polymerization by charging additional monomer or monomers as before.

If a linear block polymer is prepared the presence of the terminal non-elastomeric segments are essential to impart the high raw tensile strength properties of the polymer.

In the formation of the radial block polymers, hereinafter discussed, these high raw tensile strength properties can be obtained by forming a polymer with the terminal segments of each polymer branch comprising a non-elastomeric segment.

It is herein noted that the expression substantially all, or similar terminology, is used throughout the specification and claims in regard to the polymerization of monomer or mixtures thereof. This terminology is employed although complete removal or polymerization of the monomer or mixtures of monomers is the desired ultimate. One-hundred percent polymerization or complete removal of unpolymerized monomer can often be very difficult. This expression therefore is intended to mean polymerization or removal of the monomer or mixtures of the monomers to that extent as can be generally accomplished under general polymerization conditions.

Likewise, the expression high raw tensile strength will be understood to mean that green tensile strengths of measurable magnitude are being referred to and in a more restrictive sense they will be at least 1200 p.s.i. green tensile.

The linear block polymers produced by this invention can in a broad sense be depicted as an A—B—A type polymer. The polymers are characterized by containing three joined segments or blocks wherein A represents a polymer segment having non-elastomeric properties and B represents an elastomeric polymer segment.

The segments or blocks of the linear block polymer are joined in an end-to-end arrangement through a primary chemical bond. Each polymeric segment can contain a sequence of monomeric units substantially of a single monomer and thus essentially comprise a homopolymer block or they can contain alternate segments of monomers and thus form a random copolymer block.

Thus the non-elastomeric terminal segments of the linear block polymer can comprise homopolymers made from monovinyl-substituted aromatic hydrocarbons containing from about 8 to 18 carbon atoms per molecule as well as copolymers, both random and block, comprising at least 70 percent by weight of one or more polymerized monovinyl-substituted aromatic hydrocarbons and not more than 30 percent by weight of one or more polymerized conjugated diene monomers containing from about 4 to 12 carbon atoms per molecule or polymerized polar monomers such as $\alpha$-, $\beta$-unsaturated nitriles and esters of acrylic and methacrylic acid.

The elastomeric segment of the linear block polymer can comprise homopolymers made from conjugated dienes containing from about 4 to 12 carbon atoms per molecule as well as copolymers, including both random and block, comprising at least 70 percent by weight of one or more polymerized conjugated dienes and not more than 30 percent by weight of one or more of said polymerized polar monomers or said monovinyl-substituted aromatic hydrocarbons.

The amount of polymer representing each polymer segment in relation to the whole linear block polymer can vary but must be of sufficient amount to impart the elastomeric or non-elastomeric properties to that particular polymer segment. Generally each polymer segment of the linear block polymer comprises at least about 10 weight percent of the total weight of the linear block polymer.

The non-elastomeric segments comprise about 20 to 80, preferably 30 to 40, weight percent of the total weight of the linear block polymer.

The elastomeric segment comprises about 80 to 20, preferably 70 to 60, weight percent of the total weight of linear block polymer.

The linear block polymer which has been broadly characterized as an A—B—A type polymer can also be characterized as an A—B—Y—B—A type polymer when the method of preparation of the linear block polymer includes the addition of a polyfunctional treating agent. As in the A—B—A type polymer the A in the

A—B—Y—B—A type polymer represents non-elastomeric polymer blocks and the two B's collectively represent the middle elastomeric polymer block with Y being representative of an atom or group of atoms derived from a polyfunctional treating agent which contained only two functional groups per molecule and which effected coupling of two A—B type block polymers to produce the linear block polymer containing the terminal non-elastomeric blocks and the middle elastomeric block.

The process employed for producing the

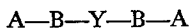

A—B—Y—B—A type linear block polymer is the same incremental monomer addition process as hereinbefore described except that the third monomer charge following the formation of the elastomeric block is eliminated and a polyfunctional treating agent which contains only two functional groups per molecule is added to the polymerization mixture, containing the A—B type polymer, after the polymerization to form the elastomeric block has been completed, but prior to the inactivation of the polymerization initiator, so as to couple said A—B type polymers to form said linear block polymer.

The radial block polymer produced by this invention can in a broad sense be depicted as an $(A—B)_xY$ type polymers or as $(A—B—A)_xY$ wherein A represents a non-elastomeric polymer block or segment and B represents an elastomeric polymer segment. Y is an atom or group of atoms derived from the polyfunctional treating agent used in the formation of the radial polymers and $x$ represents the number of functional groups of said polyfunctional treating agent and is an integer of at least 3.

The radial block polymers are produced by the same incremental addition of monomer method as hereinbefore depicted for the formation of linear block polymers with the additional step of adding a polyfunctional treating agent to the polymerization mixture after the polymerization has been completed but prior to the inactivation of the polymerization initiator.

Thus a radial block polymer can be characterized as having at least three polymer branches with each branch of the radial block polymer comprising terminal non-elastomeric segments.

The branches of the radial block polymer contain a terminal non-elastomeric segment and at least a second elastomeric polymer segment joined thereto. The branches can also contain a third segment of non-elastomeric polymer.

The polymer branch lastly described would then be identical to the aforedescribed linear block polymers of this invention. Coupling the linear block polymer with the polyfunctional treating agent having at least three functional groups thus forms one type of radial polymer. The most common types, however, of radial block polymers prepared according to this invention contain only a terminal non-elastomeric segment and an elastomeric segment.

The non-elastomeric terminal segment of the radial block polymer comprise homopolymers made from monovinyl-substituted aromatic hydrocarbons containing from about 8 to 18 carbon atoms per molecule as well as copolymers including both random and block, comprising at least 70 percent by weight of one or more polymerized monovinyl-substituted aromatic hydrocarbon monomers and not more than 30 percent by weight of one or more of said conjugated diene monomers or polar monomers such as $\alpha$-, or $\beta$-unsaturated nitriles and esters of acrylic and methacrylic acid.

The elastomeric segment of the radial polymer branch comprises polymers prepared from conjugated dienes containing from about 4 to 12 carbon atoms per molecule as well as copolymers including both random and block thereof, comprising at least 70 percent by weight of one or more polymerized conjugated diene monomers and not more than 30 percent by weight of one or more of said polymerized polar monomers or said monovinyl-substituted aromatic hydrocarbon monomers.

The amount of polymer representing each polymer segment in relation to the whole radial block polymer can vary but must be of sufficient amount to impart the elastomeric or non-elastomeric properities to that particular polymer segment. Generally, each polymer segment of the radial block polymer comprises at least 5 weight percent of the total weight of the block polymer.

The non-elastomeric segments comprise about 20 to 80, preferably 30 to 40 weight percent of the total weight of the radial block polymer with the elastomeric segments comprising about 80 to 20, preferably about 70 to 60, weight percent of the total weight of the radial block polymer.

The primary hydrocarbyllithium initiators employed in this invention can be represented by the general formula $RCH_2Li$, wherein R is an alkyl, cycloalkyl, or combinations thereof, such as cycloalkylalkyl, hydrocarbon radical containing from 3 to 11 carbon atoms. Exemplary of the primary hydrocarbyllithium initiators are n-butyllithium;
n-dodecyllithium;
n-octyllithium;
(cyclohexyl)methyllithium;
(cyclodecyl)methyllithium;
(2-cycloheptyl)ethyllithium;
(3-ethylcyclopentyl)methyllithium;
isobutyllithium;
2,6-dimethyl-4-ethylheptyllithium;
n-pentyllithium;
n-hexyllithium;
n-heptyllithium;
2-(4-ethylcyclohexyl)ethyllithium; and the like.

The amount of hydrocarbyllithium employed can be varied over broad ranges but will generally be in the range of about 0.1 to 10, perferably 1.0 to 4.0, gram millimoles per 100 grams of monomer employed.

The polar compound adjuvants employed according to this invention are ethers, thioethers (sulfides) and tertiary amines containing from 2 to 24 carbon atoms per molecule. The polar compound adjuvant is employed in an amount sufficient to provide from about 0.01 to 100 gram millimoles per 100 grams of monomer employed, preferably 0.2 to 10 (mhm.).

Exemplary polar compound adjuvants are dimethyl ether; diethyl ether; ethyl methyl ether; ethyl propyl ether; di-n-propyl ether; di-n-octyl ether; di-n-dodecyl ether; dibenzyl ether; diphenyl ether; dicyclohexyl ether; decyl cyclohexyl ether; cyclopentyl phenyl ether; anisole; tetrahydrofuran; 1,2-dimethoxyethane; 1,3-dioxane, 1,4-dioxane; paraldehyde; 1,12-di-hexoxydodecane, dimethyl sulfide; diethyl sulfide; di-n-dodecyl sulfide; dimethylethylamine; N,N-dimethylaniline; pyridine; quinoline; N-ethylpiperidine, N-methyl-N-ethylaniline; N-methylmorpholine, and the like.

The polyfunctional treating agents employed according to this invention in the preparation of the radial block polymers are the polyepoxides, polyimines, polyisocyanates, polyaldehydes, or polyhalides described in U.S. Pat. 3,281,383 issued to Zelinski et al. Oct. 25, 1966, and the tin compounds disclosed in U.S. Pat. 3,393,182 issued to Trepka July 16, 1968. As stated before the number of functional groups per molecule of said polyfunctional treating agent in the preparation of the radial block polymers is at least three. One of said functional groups, i.e. one equivalent, per gram atom of lithium is the optimum.

The polyfuntcional treating agents that can be employed according to this invention in the preparation of linear block polymers are those compounds that correspond to the treating agents disclosed for radial block polymer formation except that said compounds contain only two functional groups per molecule instead of the at least three functional groups per molecule.

Accordingly the diisocyanates, diimines (diaziridinyl), dialdehydes, dihalides, etc. can be employed as polyfunctional treating agents for linear block polymer formation. Exemplary compounds are benzene-1,4-disocyanate,
naphthalene-2,6-diisocyanate;
naphthalene-1,3-diisocyanate;
di(1-aziridinyl)ethylphosphine oxide;
di(2-phenyl-1-aziridinyl)propyl phosphine oxide;
di(2,3-dimethyl-1-aziridinyl)hexyl phosphine sulfide;
1,4-naphthalene dicarboxyaldehyde;
1,5-pentanediol;
1,9-anthracene dicarboxyaldehyde;
2,4-hexanedione;
1,10-anthracenedione;
dichlorodiethylsilane;
dibromodibutylsilane;

difluorodicyclohexylsilane;
di-n-hexyldifluorotin;
diphenyldibromotin;
diethyldiallyltin;
dicyclohexyldichlorotin;
didedecylchlorobromotin;
di(3-methylphenyl)chloroallyltin; and the like.

Other suitable difunctional treating agents include carbon dioxide and the divinyl aromatic compounds disclosed in U.S. Pat. 3,280,084, issued to Zelinski et al., Oct. 18, 1966. Exemplary are 1,3-divinylbenzene; 1,6-divinylnaphthalene; 4,4'-divinylbiphenyl; and the like.

The polyfunctional treating agent can be employed in amounts sufficient to provide about 0.05 to 2, preferably 0.5 to 1.5 equivalents per gram atom of lithium employed in said initiator.

As hereinbefore stated, the polyfunctional treating agent is added to the polymerization mixture after the polymerization has been completed and prior to the inactivation of the initiator.

As hereinbefore mentioned, some of the monomers that can be employed to form the linear and radial block polymers according to this invention include conjugated dienes containing from about 4 to 12 carbon atoms per molecule, monovinyl-substituted aromatic hydrocarbons containing from about 8 to 18 carbon atoms per molecule. Exemplary conjugated dienes are 1,3-butadiene, isoprene, 1,3-pentadiene, 2,3-dimethyl-1,3-butadiene, 2-ethyl-1,3-pentadiene, 1,3-hexadiene, 2-methyl-1,3-hexadiene, 1,3 - octadiene, 2-methyl-1,3-undecadiene, 2-methyl-3-isopropyl-1,3-butadiene, and the like.

Exemplary monovinyl-substituted aromatic hydrocarbons are styrene; 3,5-diethylstyrene; 4-n-propylstyrene; 4-cyclohexylstyrene; 4-phenylstyrene; 4-methoxystyrene; 3-pentoxystyrene; 2,4,6 - trimethylstyrene; 4-decylstyrene; 1-vinylnaphthalene; 8-phenyl-1-vinylnaphthalene; 3-benzylstyrene; and the like.

Exemplary of the beforementioned monomers which can be employed in the formation of polymer segments formed from polymerized mixtures of monomers are epsilon-caprolactone; epsilon-thiocaprolactone; propylene sulfide; acrylonitrile; methacrylonitrile; butyl acrylate; methyl methacrylate; acetaldehyde; and the like.

Polymerization conditions well known as suitable for the preparation of polymers using the organolithium catalysts can be so employed according to this invention.

Temperatures can vary over a broad range. Temperatures from —80° C. to 150° C., preferably from 40° to 120° C. are exemplary. The polymerization reaction can be conducted under autogenous pressure. It is usually desirable to operate at pressure sufficient to maintain the monomeric material substantially in the liquid phase.

The polymerization can be conducted in the presence or absence of diluent. Inert hydrocarbon diluents selected from aromatics, paraffins, or cycloparaffins, and mixtures thereof, containing from about 4 to 10 carbon atoms can be suitably employed. The diluent or diluent mixture is one which is liquid under the conditions of the polymerization process and exemplary diluents are isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene, and the like.

It is an important aspect in the polymerization process of this invention that the polar compound adjuvant be present when the monomeric material and the hydrocarbyllithium initiator are contacted. The polar compound adjuvant and the hydrocarbllithium initiator can, however, be contacted in the presence or absence of solvent or monomer.

The polymers can be recovered by any of the well known processes employed throughout the arts.

The block polymers produced according to this invention possess high raw tensile strength (i.e. green tensile)

and depending upon their relative elastomeric/non-elastomeric properties have wide application in the polymer industry.

Those block polymers generally possessing elastomeric qualities have application where other synthetic and natural rubbers are employed.

The high green tensile strength of the elastomeric block polymers produced according to the process of this invention makes them suitable for many uses without vulcanization. They have applications as shoe soles, molded articles such as toys, containers, pipe and the like. They can be employed in the manufacture of tires, gaskets, and other rubbery type articles. They also find application in adhesive uses such as pressure-sensitive tapes, and in caulking and sealing compositions. They can additionally be employed in blends with other polymers to impart strength to uncured stocks. They can also be blended with extender oils, and other additives such as antioxidants, fillers, and other well known additives.

The non-elastomeric block polymers produced according to the process of this invention have application in the preparation of containers, sheeting, film and the like. In many cases, transparent products can be made with these polymers. These polymers also can be oriented during formation of the article and can be compounded with the usual heat and light stabilizers, pigments, antioxidants, plasticizers and the like.

Illustrative of the foregoing discussion and not to be interpreted as a limitation on the scope thereof or on the compounds therein employed, the following examples are presented.

EXAMPLE I

Runs were conducted in which n-butyllithium, with varying amounts of tetrahydrofuran (THF), was employed for the preparation of linear block (styrene/butadiene/styrene) polymers. A control run was also conducted which employed sec-butyllithium as the initiator. The polymerization recipe and results are shown in Table I.

TABLE I

Polymerization recipe

| Initial charge: | Parts by weight |
|---|---|
| Cyclohexane | 780 |
| Styrene | 20 |
| THF | Variable |
| Butyllithium (2.0 mmoles) | 0.124 |
| Temperature, ° C.: | |
| Initiation | 50 |
| Polymerization | 70 |
| Time, hours | 0.5 |
| First increment: | |
| Butadiene | 60 |
| Temperature, ° C | 70 |
| Time, hours | 1 |
| Second increment: | |
| Styrene | 20 |
| Temperature, ° C | 70 |
| Time, hours | 1 |

RESULTS

| Run No. | RLi type | THF, mhm. [a] | Inherent viscosity [b] | Green tensile, p.s.i. [c] | Elongation, percent [c] |
|---|---|---|---|---|---|
| 1 | n-Butyl | 0 | 0.74 | 530 | 630 |
| 2 | do | 0.139 | 0.79 | 4,090 | 970 |
| 3 | do | 0.417 | 0.71 | 4,010 | 780 |
| 4 | do | 1.39 | 0.68 | 4,630 | 700 |
| 5 | do | 4.17 | 0.71 | 4,450 | 720 |
| 6 | sec-Butyl | 0 | 0.67 | 4,100 | 810 |

[a] mhm.=gram millimoles per 100 g. of monomers.
[b] Determined according to procedure in U.S. 3,278,508, col. 20, notes (a) and (b). All polymers were gel-free.
[c] ASTM D-412-62T.

In each of these runs, cyclohexane was charged to the reactor first followed by a nitrogen purge. Styrene was then charged followed by THF (if added). The mixture was then heated to 50° C. then the butyllithium was charged and the temperature quickly adjusted to 70° C. to simulate an adiabatic polymerization. The first and second monomer increments were charged at the times indicated in the recipe. At the end of each polymerization run, each mixture was charged with a 10 weight percent solution of 2,2'-methylene-bis(4-methyl-6-tert-butylphenol) in an equivolume mixture of isopropyl alcohol and toluene with the amount added being sufficient to provide one part of the antioxidant per 100 parts of monomers charged. Each of the terminated mixtures was stirred with isopropyl alcohol to precipitate the polymer. The polymer was separated and dried under vacuum at about 60° C.

The results demonstrate that the small amounts of THF employed with the n-butyllithium initiator provide a means for producing block polymers with as good or better green tensile strength than that obtained with sec-butyllithium and much better than that obtained with n-butyllithium in the absence of THF.

EXAMPLE II

Runs were conducted in which radial block polymers were prepared according to this invention. Again, control runs using sec-butyllithium and n-butyllithium without THF were also made. The polymerization recipe and results are shown in Table II.

TABLE II

Polymerization recipe

| Initial charge: | Parts by weight |
|---|---|
| Cyclohexane | 780 |
| Styrene | 40 |
| Tetrahydrofuran (THF) | Variable |
| Butyllithium (3.6 mmoles) | 0.223 |
| Temperature, ° C. (initiation) | 50 |
| Time, hours (polymerization) | 0.5 |
| First increment: | |
| Butadiene | 60 |
| Temperature, ° C | 70 |
| Time, hours | 1 |
| Second increment (coupling): | |
| Silicon tetrachloride (0.75 mmole) | 0.12 |
| Temperature | 70 |
| Time, hours | 1 |

RESULTS

| Run No. | RLi type | THF, mhm. | Inherent viscosity [1] | Green tensile, p.s.i.[1] | Elongation, percent [1] |
|---|---|---|---|---|---|
| 1 | n-Butyl | 0 | 0.81 | 500 | 450 |
| 2 | do | 0.695 | 0.73 | 4,460 | 725 |
| 3 | do | 1.39 | 0.64 | 5,300 | 730 |
| 4 | do | 2.78 | 0.74 | 4,860 | 730 |
| 5 | do | 5.56 | 0.67 | 4,860 | 710 |
| 6 | sec-Butyl | 0 | 0.75 | 4,850 | 700 |

[1] As in Example I.

The charging and polymer isolation procedures employed in these runs were the same as those employed in Example I.

Again, the results show that small amounts of THF employed with n-butyllithium produced radial block polymers of high green tensile strength and these raw strength values were as good or better than those obtained with sec-butyllithium in the absence of THF and much better than that obtained with n-butyllithium in the absence of THF.

EXAMPLE III

Another series of runs employed triethylamine as the polar compound in the preparation of linear block copolymers according to this invention. The same type of control run employed in Examples I and II was also used in this series. The charging and polymer isolation procedures were also the same as those described in Example I. The polymerization recipe and results are shown in Table III.

TABLE III

| | Parts by weight |
|---|---|
| Initial charge: | |
| Cyclohexane | 780 |
| Styrene | 20 |
| Triethylamine | Variable |
| n-Butyllithium (2.0 mmoles) | 0.124 |
| Temperature, ° C. initiation | 50 |
| Polymerization | 70 |
| Time, hours | 0.5 |
| First increment: | |
| Butadiene | 60 |
| Temperature, ° C | 70 |
| Time, hours | 1 |
| Second increment: | |
| Styrene | 20 |
| Temperature, ° C | 70 |
| Time, hours | 1 |

RESULTS

| Run No. | Triethylamine, mhm. | Inherent viscosity [1] | Green tensile, p.s.i.[1] |
|---|---|---|---|
| 1 | 0 | 0.82 | 1140 |
| 2 | 0.099 | 0.77 | 1790 |
| 3 | 0.198 | 0.77 | 2650 |
| 4 | 0.297 | 0.76 | 2520 |
| 5 | 0.396 | 0.75 | 3260 |
| 6 | 0.495 | 0.75 | 3850 |
| 7 | 0.990 | 0.75 | 4220 |
| 8 | 2.97 | 0.74 | 4180 |

[1] As in Example I.

These results again demonstrate the use of small amounts of triethylamine provides teleblock polymers of much higher green tensile strength when employed with n-butyllithium than that obtained with n-butyllithium alone.

I claim:

1. A polymerization process for preparing high raw tensile strength block polymers comprising:

(a) forming a first block of non-elastomeric segment by contacting, in the presence of a polar compound adjuvant, a primary hydrocarbyllithium initiator with a monomer feed consisting essentially of at least one monovinyl-substituted aromatic hydrocarbon monomer containing from about 8 to 18 carbon atoms per molecule and continuing said contacting until substantially all of said at least one monovinyl-substituted aromatic hydrocarbon monomer is polymerized, then (b) forming an elastomeric segment on said non-elastomeric segment by adding to the mixture resulting from said step (a) a monomer feed which is (I) at least one conjugated diene monomer containing from about 4 to 12 carbon atoms per molecule, or (II) a conjugated diene containing from about 4 to 12 carbon atoms per molecule and at least one monovinyl-substituted aromatic hydrocarbon monomer containing from about 8 to 18 carbon atoms per molecule, and continuing said contacting until substantially all of said monomer feed added in said step (b) is polymerized, then (c) forming a second block of non-elastomeric segment onto said elastomeric segment by adding to the mixture resulting from said step (b) a monomer feed consisting essentially of at least one monovinyl-substituted aromatic hydrocarbon monomer containing from about 8 to 18 carbon atoms per molecule and continuing said contacting until substantially all of said at least one monovinyl-substituted aromatic hydrocarbon monomer added in said step (c) is polymerized;

wherein said polar compound adjuvant contains from 2 to 24 carbon atoms per molecule and is ether, thioether, or tertiary amine, and is employed in an amount to provide from about 0.01 to 100 gram millimoles per 100 grams of said monomers employed in said polymerization process, and wherein said primary hydrocarbyllithium initiator is $RCH_2Li$ wherein R is an alkyl or cycloalkyl hydrocarbyl radical, or combination thereof, containing from about 3 to 11 carbon atoms per R, and said initiator is employed in an amount to provide from about 0.1 to 10 gram millimoles of said initiator per 100 grams of said monomers employed in said polymerization process;

and wherein each of said first non-elastomeric segment and said second non-elastomeric segment each comprise at least about 10 weight percent, and said non-elastomeric segment comprises about 80 to 20 weight percent, of the total weight of the block polymer.

2. The process of claim 1 wherein in said step (b) said monomer feed is said (II) so as to form in said step (b) a block or random copolymer segment comprising at least 70 percent by weight of polymerized conjugated diene monomer and not more than 30 percent by weight of polymerized monovinyl-substituted aromatic hydrocarbon monomer.

3. The process of claim 1 wherein said polar compound adjuvant is employed in an amount to provide from about 0.2 to 10 gram millimoles of adjuvant per 100 grams of monomer employed in said polymerization process, said initiator is employed in an amount to provide from about 1.0 to 4.0 millimoles of initiator per 100 grams of monomer employed in said polymerization process, said polymerization process includes the addition of a polyfunctional treating agent to the polymerization mixture, after polymerization of the monomer feed in said step (c) and prior to inactivation of the polymerization initiator, in an amount sufficient to provide from about 0.05 to 2 equivalents per gram atom of lithium employed in said initiator, and said polyfunctional treating agent is polyepoxide, polyamine, polyisocyanate, polyaldehyde, polyhalide, or tin compound.

4. The process of claim 1 wherein said polymerization process is conducted at a temperature in the range of from about −80° to 150° C., at a pressure sufficient to maintain the monomeric materials substantially in the liquid phase, and in the presence of an inert hydrocarbon diluent selected from aromatics, paraffins, cycloparaffins, or mixtures thereof, containing from about 4 to 10 carbon atoms, wherein said monovinyl-substituted aromatic hydrocarbon monomer in said step (a) is styrene, said conjugated diene is butadiene, said polar compound adjuvant is tetrahydrofuran or triethylamine, said diluent is cyclohexane, and said initiator is n-butyllithium.

References Cited

UNITED STATES PATENTS

| | | | |
|---|---|---|---|
| 3,239,478 | 3/1966 | Harlan | 260—880 B |
| 3,281,383 | 10/1966 | Zelinski et al. | 260—880 B |
| 3,287,333 | 11/1966 | Zelinski | 260—880 B |
| 3,333,024 | 7/1967 | Haefele et al. | 260—880 B |
| 3,449,306 | 6/1969 | Zelinski | 260—880 B |

HARRY WONG, Jr., Primary Examiner